United States Patent [19]
Herbenar

[11] 3,849,010
[45] Nov. 19, 1974

[54] DUAL SEAT SOCKET JOINT
[75] Inventor: Edward J. Herbenar, Detroit, Mich.
[73] Assignee: TRW Inc., Cleveland, Ohio
[22] Filed: May 2, 1973
[21] Appl. No.: 356,633

Related U.S. Application Data
[63] Continuation-in-part of Ser. No. 274,870, July 25, 1972, abandoned, and a continuation of Ser. No. 408,152, Oct. 19, 1973.

[52] U.S. Cl. .............................................. 403/138
[51] Int. Cl. .......................................... F16c 11/06
[58] Field of Search ........................... 403/122–140, 403/144, 147

[56] References Cited
UNITED STATES PATENTS
| | | | |
|---|---|---|---|
| 3,004,786 | 10/1961 | Herbenar | 403/140 |
| 3,128,110 | 4/1964 | Herbenar | 403/138 |
| 3,168,339 | 2/1965 | Townsend | 403/138 |
| 3,272,541 | 9/1966 | Latzen | 403/138 |
| 3,290,074 | 12/1966 | Korecky | 403/132 |

FOREIGN PATENTS OR APPLICATIONS
| | | | |
|---|---|---|---|
| 1,005,682 | 9/1965 | Great Britain | 403/138 |

Primary Examiner—Geo. V. Larkin
Attorney, Agent, or Firm—Hill, Gross, Simpson, Van Santen, Chiara & Simpson

[57] ABSTRACT

A dual seat ball and socket joint useful in automotive steering linkages and wheel suspensions, having a rigid load carrying bearing ring supporting the ball end of a ball stud in a housing and a split resilient wear take up bearing ring in the housing axially spaced from the load carrying ring and spring-urged axially against the ball end toward the load carrying ring and radially against the housing to maintain the joint components in bearing engagement. The axial shifting of the wear take-up bearing toward the load carrying bearing is arrested before the load carrying bearing wears sufficiently to permit the ball from being pulled out of the housing. The radial spring loading of the wear take-up bearing wedges this bearing into tight engagement with the housing to prevent shifting of the bearing away from the load carrying bearing and thereby preventing unseating of the ball.

10 Claims, 5 Drawing Figures

PATENTED NOV 19 1974          3,849,010
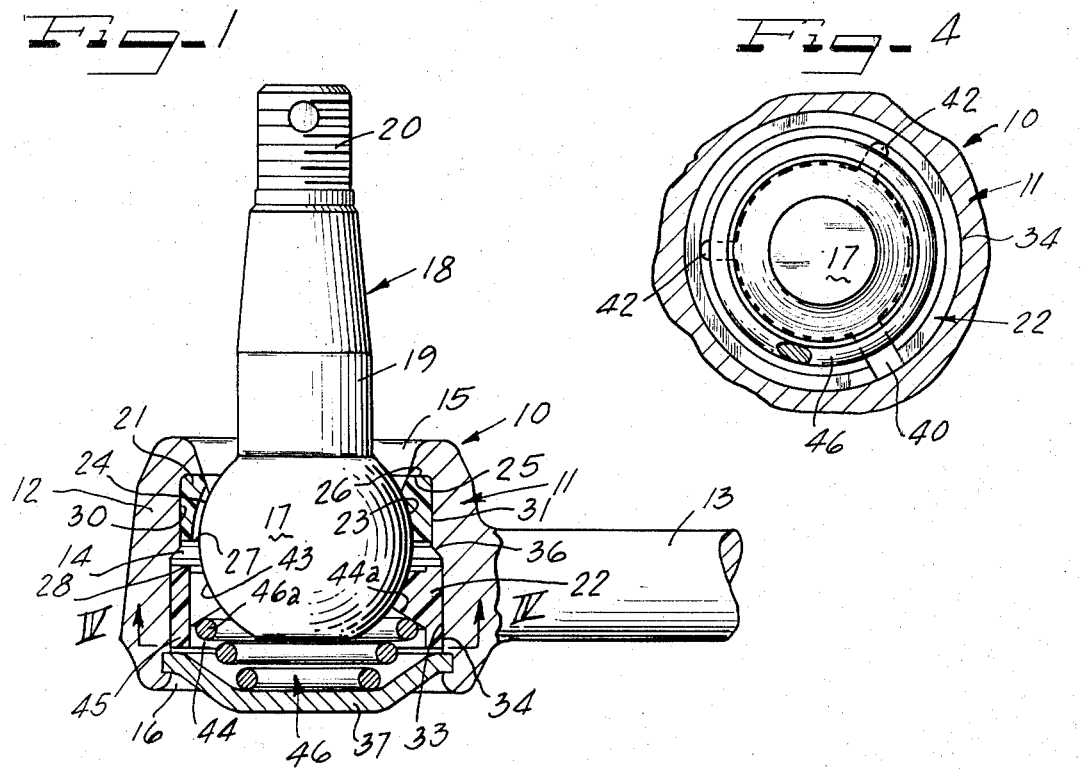
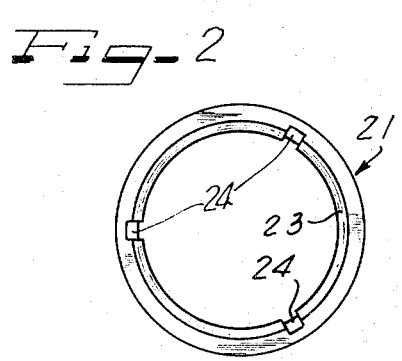
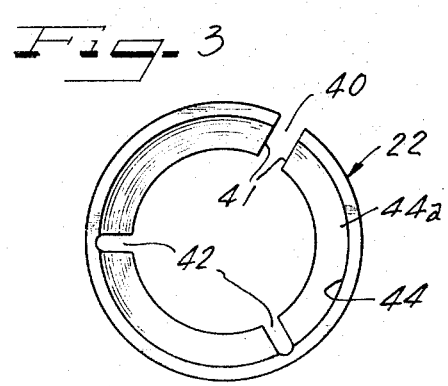
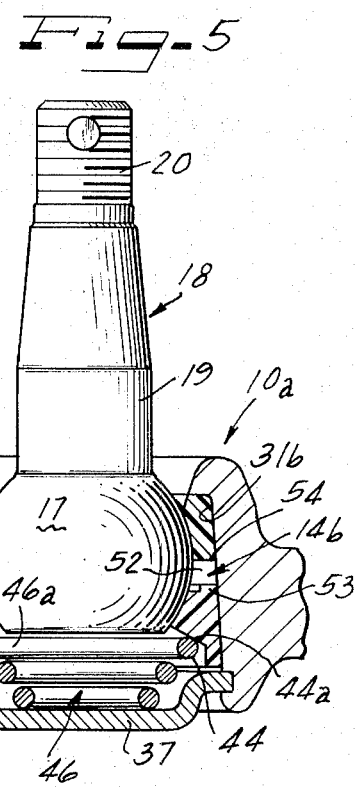

3,849,010

DUAL SEAT SOCKET JOINT

RELATED APPLICATION

This application is a continuation-in-part of the Edward J. Herbenar U.S. Pat. application entitled, "Dual Seat Ball and Socket Joint", Ser. No. 274,870, filed July 25, 1972 in Art Group 355, the disclosure of which is incorporated herein by reference. This application is now abandoned and replaced by continuation application Ser. No. 408,152 filed Oct. 19, 1973.

1. Field of the Invention

This invention relates to wear take-up joints resisting unseating of the joint components and particularly deals with a dual seat ball and socket joint for automotive steering linkages and wheel suspensions having a rigid load carrying bearing in a housing receiving the shank of a ball stud therethrough and supporting the portion of the ball end of the stud adjacent the shank in the housing together with a resilient wear take-up bearing slidable in the housing and spring loaded axially against the portion of the ball extending beyond the load carrying bearing and radially against the housing to maintain the ball in bearing engagement with the load carrying bearing and locked against movement away from the load carrying bearing thereby preventing unseating of the ball from the load carrying bearing.

2. Prior Art

Ball and socket joints have axially spaced split plastic bearing rings supporting the ball end of a ball stud in a housing with one of the rings spring urged toward the other ring are known in the prior art, for example, in the Edward J. Herbenar U.S. Pat. No. 3,128,110 issued Apr. 7, 1964. Such joints did not arrest the axial shifting of the spring loaded ring before the other ring became sufficiently worn to permit the ball stud to pull out of the housing and relied upon radial force vectors on the split bearings developed by the axial bearing load against the ball end of the stud to urge the split rings against the housing. These radial force vectors were insufficient to prevent unseating of the ball from the load carrying bearing under compression loads.

SUMMARY OF THE INVENTION

The present invention now provides dual bearing ball and socket joints with an anti-unseating feature especially useful in joints for automotive steering linkages and wheel suspensions where the ball stud is subjected to shock and impact loads tending to move it away from its seat thereby accommodating lateral shifting of the components with loss of steering control or wheel alignment. This unseating is prevented by providing an inclined spring abutment surface on a split resilient wear take-up bearing so that the take-up force is exerted both axially and radially. Thus, the wear take-up bearing is forced against the ball toward the load carrying bearing to maintain the ball in good bearing contact with both bearings while at the same time the wear take-up bearing is expanded radially into tight engagement with the housing. Then when loads are imposed on the ball stud tending to compress the spring, the increased spring force will be effective to lock the wear take-up bearing against shifting in the housing away from the load bearing and the stud will be held in good bearing engagement with the load carrying bearing. The true tilting center for the stud is thus maintained and looseness in the assembly is prevented.

The permitted range of movement of the wear take-up bearing toward the load take-up bearing is limited, as in the aforesaid parent application Ser. No. 274,870, filed July 25, 1972 so that looseness in the joint will be detected before the load carrying bearing is worn to a large enough diameter where the ball might pull through the bearing and out of the housing under severe loads.

The load carrying bearing is preferably a rigid wear resisting ring made of metal such as steel, sintered iron, or of a high density plastics material. The wear take-up bearing is a split ring of somewhat resilient plastics material such as nylon, polyethylene and the like. Both rings have grease grooves in their bearing surfaces and the grooves in the wear take-up bearing are deep to increase the radial flexibility of the split ring. These deep grooves are spaced relative to each other and relative to the split ends of the ring to facilitate wrapping of the ring around the ball end of the stud in mating relation therewith. Both rings, of course, have fragmental spherical inner bearings walls to receive the ball and outer peripheral walls to mate with the housing. The housing has an internal cavity with axial open ends, one of which has an inturned lip surrounding a throat receiving the shank of the ball stud therethrough and the other end of which is closed by a closure plate. The cavity may have a first cylindrical bore terminating at one end at the lip and at the other end by an outturned shoulder or step extending to a larger cylindrical bore closed by the closure plate. The load carrying bearing is pressed or slip fitted into the small bore and bottomed against the lip while the wear take-up bearing is slidable in the larger bore only to the shoulder or step. The parts are dimensioned so that when the wear take-up bearing reaches the shoulder or step the load bearing will be worn to its safety limit.

In a modification the housing cavity or at least the portion receiving the wear take-up bearing is tapered toward the inturned lip and the parts are dimensioned so that the split wear take-up bearing will be contracted to its maximum capacity as by closing the gap between the split ends thereof when the load carrying bearing is worn to a predetermined maximum.

Therefore, as in the aforesaid application, Ser. No. 274,870, looseness is permitted to develop in the joint before the load carrying bearing is worn to a degree where excessive loads might pull the wall stud out of the housing.

According to the present invention, the wear take-up bearing has a tapered or beveled abutment surface receiving the large end coil of a conical spring compressed against the bearing by the closure plate for the housing. The taper or bevel converges from a major diameter surrounding the large end coil of the spring to a minor diameter less than the diameter of the end coil of the spring and the spring force is thereby exerted axially toward the load carrying bearing and radially outward toward the bore of the housing. This radial load expands the wear take-up bearing into tight engagement with the housing bore and increases the radial force vector that is created by the axial load on the ball. The added radial force vector is sufficient to overcome shifting of the wear take-up bearing away from the load carrying bearing under loads exerted on the ball stud tending to unseat the stud from its load carrying bearing.

It is then an object of the present invention to provide a nonunseating feature to ball and socket joints of the type disclosed and claimed in the aforesaid parent application Ser. No. 274,870.

Another object of the invention is to provide a wear take-up joint with a nonunseating feature.

A further object of the invention is to provide a ball and socket joint for automotive steering gear and wheel suspensions which will resist unseating of the joint components under shock loads and other loads tending to move the joint stud off of its seat.

Another object of the invention is to provide an improved dual seat ball and socket joint having a radially expanded wear take-up seat which is wedged-locked in the joint housing under loads on the ball tending to unseat the ball from its load carrying bearing in the housing.

Other and further objects of this invention will become apparent to those skilled in this art from the following detailed description of the annexed sheet of drawings which, by way of preferred examples only, illustrates several embodiments of the invention.

BRIEF DESCRIPTION OF THE DRAWINGS

FIG. 1 is a fragmentary vertical cross-sectional view, with parts in elevation, of a ball and socket joint constructed according to the principles of this invention;

FIG. 2 is a bottom plan view of the load carrying bearing in FIG. 1 in this invention;

FIG. 3 is a bottom plan view of the wear take-up bearing in FIG. 1;

FIG. 4 is a fragmentary transverse sectional view taken along the line IV—IV of FIG. 1; and FIG. 5 is a view similar to FIG. 1 illustrating a modified form of the joint of this invention.

DESCRIPTION OF THE PREFERRED EMBODIMENTS

FIG. 1 illustrates a universal type ball and socket joint 10. The ball and socket joint includes a housing member 11 with an eye end 12 and a shank or stem 13 projecting therefrom. The housing end 12 has an internal cavity 14 therein with axially open ends 15 and 16. The cavity 14 receives the ball end 17 of a stud 18 which has a shank portion 19 projecting through the open end 15 of the housing 12. The shank 19 terminates in a threaded portion 20 for connection to a steering linkage member or wheel support member. The open end 15 is referred to as the throat end opening to the cavity 14.

Disposed within the interior of the cavity 14 is a nonyielding, rigid load carrying bearing ring 21 and a wear take-up resilient plastics split bearing ring 22. The load carrying bearing 21 is pressed or slip-fitted into the cavity 14 and is preferably manufactured of ferrous or other metal or long-wearing substantially rigid plastics material. The bearing 21 has a part-spherical inner surface 23 which mates against the spherical ball 17. Grooves 24 extend axially in the surface 23 for supplying lubrication to the mating interface between the ball and the bearing. The bearing 21 has an outboard axial end face or wall 25 which mates against an in-turned lip 26 of the housing at the throat opening 15 and an inboard axial end face or wall 27 positioned within the cavity in spaced relation to the inboard end face or wall 28 of the wear take-up bearing 22. The outer periphery 30 of the load carrying bearing 21 is preferably dimensioned with respect to the bore 31 of the housing cavity 14 to have a press or slip-fit therewith.

The wear take-up bearing 22 has an outer diameter 33 received within the cavity in contact with the bore 34 of the cavity 14 spaced below the load bearing 21. It will be appreciated that in the embodiment illustrated in FIG. 1, the cavity 14 is stepped so that the bore walls 31, 34 of the cavity 14 have different diameters. In the illustrated embodiment, the diameter of the wall portion 34 will be greater than the diameter of the wall portion 31 providing a step or shoulder 36 intermediate the two wall portions. Further, the wall portion 34 surrounding the wear take-up bearing may be tapered to increase in diameter from the step 36 to the closure cap 37 closing the large axial open end 16.

As best illustrated in FIG. 3, the wear take-up bearing is split as at 40, providing a gap having circumferential ends 41. Further, deep lubrication grooves 42 may be provided in the inner surface 43 of the wear take-up bearing. The inner surface 43 is spherically curved and mates with the surface of the ball 17. A centrally disposed recess 44 may be provided in the outboard axial end 45 of the wear take-up bearing for receipt of a coil spring 46 which is entrapped between the bottom of the recess 44 and the closure cap 37 to urge the wear take-up bearing against the ball 17.

Because of the split 40, the wear take-up bearing is circumferentially expansible and contractible. As wear occurs between the ball end 17 and the bearing rings 21 and 22, the spring 46 will maintain the wear take-up bearing 22 against the ball 17 and shift it axially toward the bearing 21. Because of the spherical seat 43 in the bearing 22, axial movement of the bearing within the cavity 14 will have a wedge effect against the wall 34 of the cavity. Further, the provision of the slot 40 and the lubrication grooves 42 assures that the bearing is able to conform with the ball end 17 of the stud and with the wall of the housing when urged toward the ball stud by the spring. The wedging action of the slotted bearing and wear take-up spring compensate for wear that occurs during the life of the assembly and helps to prevent unseating of the ball 17 from the load carrying bearing 21.

Means are provided to prevent further wear take-up when wear has reached a predetermined point. In the embodiment of FIG. 1, the means are the step 36. As wear develops, the spring 46 will urge the wear take-up bearing axially of the cavity towards the step 36. When the inboard axial end 28 of the wear take-up bearing 22 contacts the step 36, further axial movement of the bearing will be prevented. Thus, any further wear will cause a looseness of the stud within the housing. This looseness can be ascertained from exterior of the housing, thereby indicating when replacement of the entire joint or components thereof is required. By controlling the distance between the step 36 and the inboard end face 28 of the wear take-up bearing 22, defined parameters can be obtained which will terminate the action of the spring at a time sufficiently prior to the point where wear would allow the ball 17 to be pushed or pulled out of the throat opening 15.

In the modification 10a of FIG. 5, the housing cavity 14b has a continuously tapered wall 50 which increases in diameter from the inturned lip 25 to the large axial end 16. The split wear take-up bearing ring 22a has a mating tapered periphery 33b to conform with the wall 50. The rigid load carrying bearing ring 21a also has a conforming tapered outer periphery 31b.

In this embodiment 10a, the means preventing further wear take-up can consist of a pre-dimensioned gap 52 between the inboard axial end 53 of the wear take-up bearing 22a and the inboard axial end 54 of the load carrying bearing 21a. Then, when the maximum amount of wear has been taken up through the action of the spring 46 pressing the wear take-up bearing 22a towards the load carrying bearing 21a, the two ends 53, 54 will contact, preventing further movement. At this time since the spring acts against the load carrying bearing through the wear take-up bearing and not against the ball stud, as further wear develops, the ball stud will become loose again in the housing to indicate that replacement is needed.

Additionally or alternatively, the amount of allowable wear take-up can be controlled by dimensioning the gap 40 of the wear take-up bearing 22a. Thus as the wear take-up bearing is forced upwardly along the tapered wall 50, the gap 40 will close and when the circumferential ends 41 contact one another, further movement of the wear take-up bearing in the cavity will be prevented by the wedge action against the wall of the cavity. Of course, the wedge action described in connection with the FIG. 1 embodiment continues to operate due to the spherical contact between the ball and the seat of the bearing. This wedge action acts to increase the resistance to side load movement of the ball within the housing.

The anti-unseating feature of this invention is accomplished by providing the recesses 44 of the wear take-up bearings 22 or 22a with a tapered top wall 44a against which the large diameter end coil 46a of the spring 46 is bottomed. This tapered wall 44a converges from the full diameter of the recess 44 to the spherical bearing wall 43 of the wear take-up bearing and the angle of convergence may be varied to control the proportion of the spring load which is converted to a radially expanding force vector. The angle of the taper may be increased to increase the radial force vector. Generally a taper of about 45° is preferred.

As shown, the spring 46 is a conical helix and its large end coil 46a will tend to expand radially as the spring is flattened. This expansion also increases the radial expanding force vector on the wear take-up bearing.

It should be understood that the tapered seat 44a for the spring 46 appreciably adds to the expansion of the wear take-up bearing against the bore wall beyond the wedging action obtained by the axial load of the wear take-up bearing on the ball. The two resulting radial expanding forces on the wear take-up bearing cooperate to lock the bearing against movement away from the load carrying bearing under compressive loads on the stud which would otherwise unseat the stud from its load carrying bearing. Any shock loads or impact loads tending to unseat the stud from its load carrying bearing are effectively resisted because such loads tend to further compress the spring 46 and thereby increase the expansion of the wear take-up bearing into locked engagement with the bore of the housing.

From the above description it should therefore be understood that this invention provides a joint with a load carrying bearing and a wear take-up bearing that is expanded radially into wedged engagement with the joint housing as it is pressed axially toward the load carrying bearing to take up wear. The proportion of the axial spring load on the wear take-up bearing that is diverted into a radial expanding force is controlled by the degree of taper of the end wall of the wear takeup bearing.

I claim as my invention:

1. A ball and socket joint adapted for automotive steering linkages and wheel suspensions which comprises a ball ended stud, a housing receiving the ball end of the stud, a load carrying bearing in the housing receiving a portion of the ball end of the stud in tiltable and rotatable relation, a split wear take-up bearing in the housing spaced from the load carrying bearing receiving a portion of the ball end of the stud projecting from the load carrying bearing, a coil spring compressed in the housing urging the wear take-up bearing toward the load carrying bearing, and said wear take-up bearing having a tapered end wall converging toward the ball end of the stud receiving the end coil of the spring thereagainst to convert a portion of the axial load of the spring on the wear take-up bearing into a radial expansion force wedging the wear take-up bearing in the housing.

2. The joint of claim 1 wherein the load carrying bearing is a rigid ring and the wear take-up bearing is a resilient split ring with a tapered end wall confronting the spring.

3. The joint of claim 2 wherein the wear take-up bearing has a recess receiving the spring and the tapered end wall converges upwardly and inwardly from the periphery of the recess to the inner periphery of the ring.

4. The joint of claim 1 wherein the housing has a first cylindrical bore receiving the load carrying ring and a second larger diameter cylindrical bore receiving the wear take-up bearing with a step between the two bores limiting the movement of the wear take-up bearing toward the load carrying bearing.

5. The joint of claim 1 wherein the wear take-up bearing, in its free state, has a gap between the split ends thereof and has deep grease grooves extending axially through its inner periphery to increase the wrap around flexibility of the ring on the ball end of the stud.

6. A ball and socket joint which comprises a ball stud having a full ball end and a shank extending therefrom, a housing having a cavity receiving the ball end of the stud therein, a lip at one end of the cavity defining a throat receiving the shank of the stud freely therethrough, a closure plate closing the opposite end of the cavity, a rigid bearing ring pressed in said cavity against said lip and embracing the portion of the ball end of the stud adjacent the shank, a split resilient wear take-up ring slidable in said housing and axially spaced from the rigid ring embracing the portion of the ball end of the stud projecting from the rigid ring, said split ring having a tapered end wall in spaced opposed relation from the closure plate and converging radially inward and axially away from the closure plate, and a conical coil spring having the small diameter coil thereof bottomed on the closure plate and the large diameter end coil thereof bottomed on said tapered end wall of the split ring to expand the split ring into wedged engagement with the housing.

7. The ball and socket joint of claim 6 wherein the portion of the housing cavity receiving the split ring is cylindrical.

8. The ball and socket joint of claim 6 wherein the portion of the housing cavity receiving the split ring converges from the closure plate toward the lip.

9. The ball and socket joint of claim 6 wherein the rigid ring is composed of metal and the split ring is composed of a plastics material.

10. The ball and socket joint of claim 6 wherein the tapered end wall of the split ring has a taper of about 45°.

* * * * *